(12) United States Patent
Lee et al.

(10) Patent No.: US 8,477,579 B2
(45) Date of Patent: Jul. 2, 2013

(54) WRITING METHOD FOR OPTICAL DISK DRIVE

(75) Inventors: Po-Wei Lee, Taoyuan County (TW); Ting-Gui Peng, Taoyuan County (TW); Song-Rui Chen, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 185 days.

(21) Appl. No.: 13/029,087

(22) Filed: Feb. 16, 2011

(65) Prior Publication Data
US 2011/0222383 A1  Sep. 15, 2011

(30) Foreign Application Priority Data
Mar. 10, 2010 (TW) ................. 99107041 A

(51) Int. Cl.
*G11B 7/00* (2006.01)
*G11B 3/74* (2006.01)
*G11B 7/125* (2012.01)

(52) U.S. Cl.
USPC .......... 369/47.53; 369/13.27; 369/59.12; 369/47.51; 369/13.26

(58) Field of Classification Search
USPC .......... 369/47.51, 47.53, 59.12, 57.53, 13.26, 369/13.27
See application file for complete search history.

(56) References Cited

U.S. PATENT DOCUMENTS

| | | | |
|---|---|---|---|
| 6,901,039 B1 * | 5/2005 | Sugie et al. | 369/47.28 |
| 7,965,603 B2 * | 6/2011 | Chen et al. | 369/59.12 |
| 2009/0154315 A1 * | 6/2009 | Miyashita et al. | 369/47.5 |
| 2009/0161506 A1 * | 6/2009 | Yamada et al. | 369/47.5 |

* cited by examiner

*Primary Examiner* — Wayne Young
*Assistant Examiner* — Dionne Pendleton
(74) *Attorney, Agent, or Firm* — Winston Hsu; Scott Margo

(57) ABSTRACT

A writing method for an optical disk drive includes receiving a command to write a disc; implementing an optimum power control (OPC) test for a predetermined data transfer rate to obtain a relation of a beta parameter to writing power; acquiring a writing power for the predetermined data transfer rate with a target beta parameter; calculating the energy area ratio of writing strategies for every data transfer rate; multiplying the energy area ratio by the writing power for the predetermined data transfer rate to produce the writing power for every data transfer rate; and compensating the writing power with automatic writing control.

9 Claims, 5 Drawing Sheets

WRITING METHOD FOR OPTICAL DISK DRIVE

BACKGROUND OF THE INVENTION

1. Field of the Invention

The present invention relates to a writing method of an optical disc drive, and more particularly, to a writing method of adjusting writing power to ensure writing quality when the optical disc drive switches the data transfer rate.

2. Description of the Prior Art

For a writable optical disc, a laser beam from a pick up head is projected onto the optical disc to burn marks (e.g., a cave or a deformation) of different lengths according to the writing power of the laser beam. A difference in reflection lights between locations with marks and without marks is utilized to form digital signals to document data.

As shown in FIG. 1, which is a writing method of a conventional optical disc drive, a spindle motor 1 rotates an optical disc 2, a pick up head 3 is moved along a radial direction of the optical disc 2, and the pick up head 3 projects a laser beam onto the optical disc 2. Since inner tracks and outer tracks of the moving disc 2 have different moving speeds, the optical disc 2 is divided into a plurality of areas of different data transfer rates from inner tracks to outer tracks, and the data transfer rate is changed gradually from low to high, for example, from 2×, 4×, 6× to 8×, etc., to enhance data transfer efficiency.

Since the optical disc 2 can be produced by many manufacturers, the materials, components and manufacturing procedures in usage may be different and the optical disc 2 may have different reaction sensitivities to the laser beam. The optical disc 2 stores recommended writing power, write strategies and quality parameters (i.e., a beta parameter) for all kinds of data transfer rates in the lead-in area 4; however, the outcome may still be different due to individual differences between different kinds of optical disc drives. Therefore, a power test area is further allocated within the lead-in area 4 of the optical disc 2 for performing a practical writing test in the neighborhood of the recommended writing power during low data transfer rate 2×. Burned marks are read out after the test, reflection lights are referred to, and decoding correctness and signal intensity etc. are determined, to calculate a beta parameter for evaluating the burned marks. The recommended beta parameter is utilized as a target to choose a corresponding writing power as the optimized writing power of the optical disc, and to complete an optimum power control (OPC) test. The optimum power control at low data transfer rate 2× cannot be directly used, so the OPC test result at low data transfer rate 2× should be utilized to estimate writing powers of high data transfer rates according to past experience.

A problem with estimating writing power according to past experience is that the writing power at high data transfer rates has a great variation and therefore it is hard to maintain a stable writing quality for the optical disc. Prior art R.O.C. Patent No. I276083 utilizes the OPC test result of low data transfer rate 2× to perform a writing operation directly, and simultaneously monitors the beta parameter when writing to compensate the writing power according to experience to achieve the target beta parameter. The writing power and the compensation value of each high data transfer rate cannot be correctly obtained, however, and therefore the beta parameter cannot quickly converge to the target value. Another prior art, R.O.C. publication No. 200917233, performs actual writing experiments at different data transfer rates; however, the storage capacity of the optical disc will be reduced if all the test areas are to be allocated in each high data transfer area. Besides, test data and test modes of each high data transfer rate must be prepared and transferred, meaning normal writing operation will be interrupted, so a longer time is required for writing and the writing efficiency is degraded. Therefore, the conventional writing method of optical disc drives still has issues concerning adjusting writing powers between high data transfer rate and low data transfer rate.

SUMMARY OF THE INVENTION

One objective of the present invention is to provide a writing method for an optical disc drive. Via comparing an energy area ratio of each write strategy and a detected energy area ratio of a predetermined data transfer rate, each writing power can be obtained via the OPC test result at low data transfer rate 2×, and a stable writing quality can be achieved.

Another objective of the present invention is to provide a writing method for an optical disc drive via utilizing an energy area ratio of a write strategy, which is in common usage, to obtain an approximate writing power of each data transfer rate.

Yet another objective of the present invention is to provide a writing method for an optical disc drive via utilizing an energy area ratio of each write strategy to obtain a variation rate of a beta parameter to a writing power at high data transfer rate, to compensate writing power and converge to a target beta parameter, and therefore enhancing overall writing efficiency.

To achieve the aforementioned goals, the writing method for an optical disc drive of the present invention comprises: firstly receiving a command to write a disc; implementing an optimum power control (OPC) test for a predetermined data transfer rate to obtain a relation of a beta parameter to a writing power; acquiring a writing power for the predetermined data transfer rate with a target beta according to the relation of beta to power; calculating the energy area ratio of write strategies for every data transfer rate; and multiplying the energy area ratio by the writing power for the predetermined data transfer rate to produce the writing power for every data transfer rate.

Another embodiment of the writing method for an optical disc drive of the present invention comprises: for each data transfer rate which still has some errors, referring to a difference between a tested beta parameter and a target beta parameter, a variation rate of the beta parameter and the writing power at a predetermined data transfer rate to increase the writing power difference according to the energy area ratio, and compensating the writing power in each data transfer rate area.

These and other objectives of the present invention will no doubt become obvious to those of ordinary skill in the art after reading the following detailed description of the preferred embodiment that is illustrated in the various figures and drawings.

DETAILED DESCRIPTION

To achieve the aforementioned goals, the methods adopted and the effects thereof are illustrated as follows with exemplary embodiments in accordance with figures.

Figure 1:
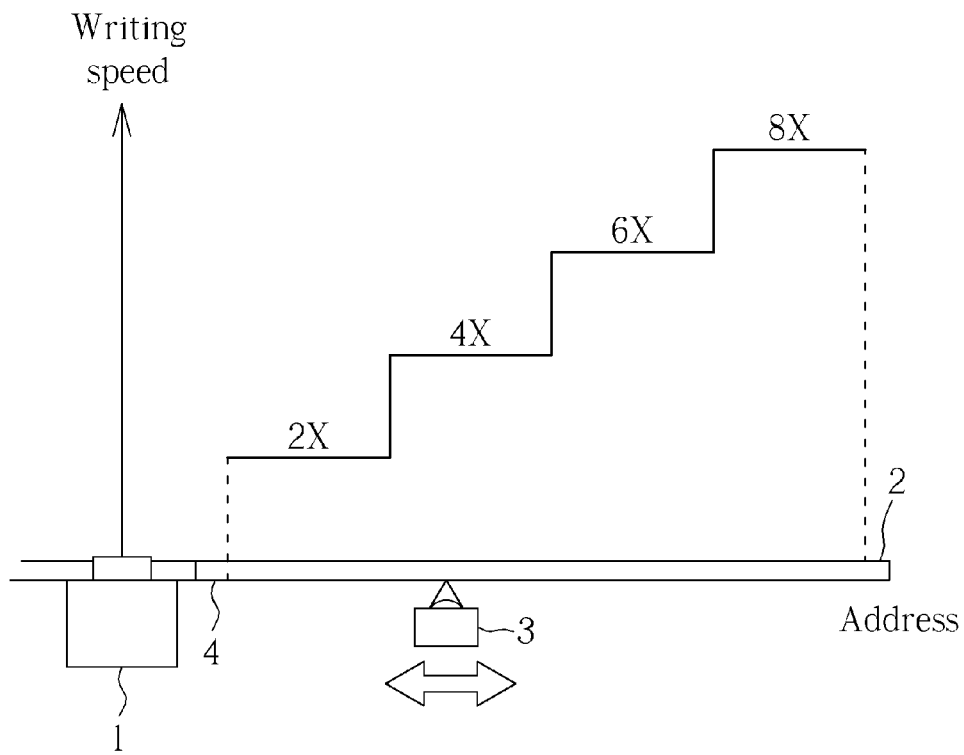
FIG. 1 is a writing method of a conventional optical disc drive.
Figure 2:
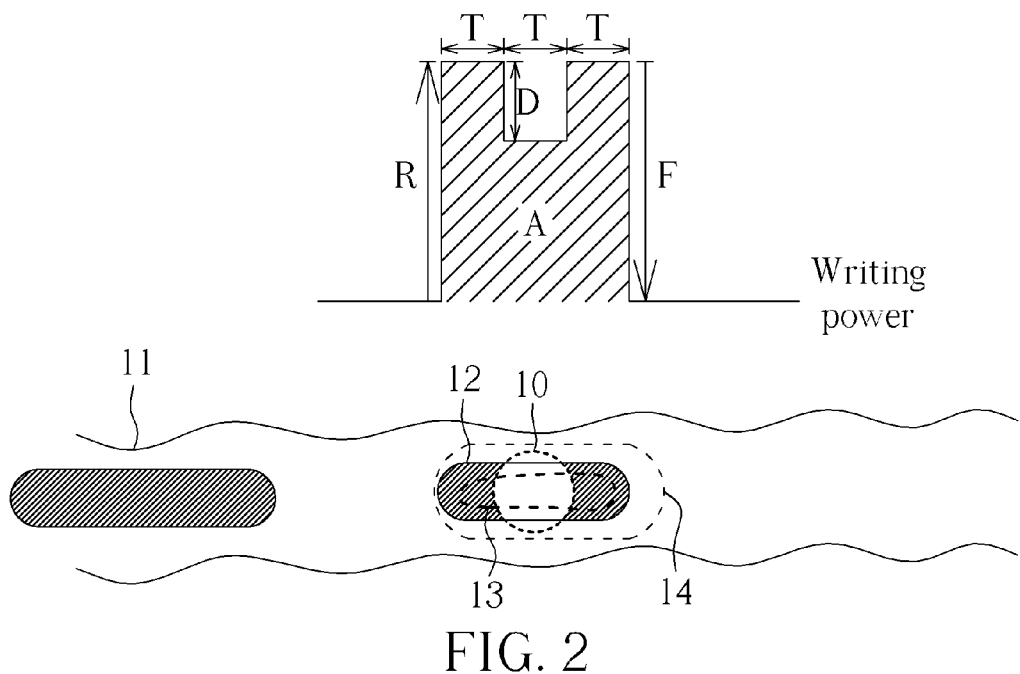
FIG. 2 is a diagram of burning marks onto an optical disc.

Please refer to FIG. 2, which is a diagram of burning marks onto an optical disc. The optical disc drive receives a writing command to burn a mark of a specific time length T, wherein the optical disc drive will refer to write strategies of each mark length stored within, e.g., write strategies of marks of 3T to 11T. In this embodiment, a mark of length 3T is utilized as an example; a pitch width modulation (PWM) of a writing power of a modulation laser beam 10 is for controlling a projection energy of the laser beam 10, and burning a mark 12 of proper size illustrated by the slashed line in the data track 11. If the writing power of the laser beam 10 is too small, the projection energy is insufficient such that a tiny or unclear mark 13 will be formed; if the writing power of the laser beam is too large, the projection energy is more than required such that an over-sized mark 14 will be formed. Therefore, either too small or too large a writing power will force the optical disc drive to receive a reflection light of the laser beam 10 with a great variation, thereby leading to a misjudgment of digital signals, and a degrading of the beta parameter.

Each optical disc stores writing power, write strategy and a target beta parameter suitable for each data transfer rate in advance. Each write strategy refers to a writing power level to set different initial writing power R, pause writing power D and finish writing power F, according to the marks of 3T to 11T at each data transfer rate. Specific time intervals are set between the writing powers, and the burned marks are maintained at a stable target beta parameter. Taking the strategy of burning a mark of 3T as an example, the time interval between the initial writing power R, the pause writing power D and the finish writing power F is one unit time T, respectively, where the projection energy is exactly suitable to burn a 3T mark of proper size, and the required target beta parameter is therefore achieved. A writing power curve, which is derived from the writing power modulated by the write strategy, has a coverage area (illustrated by the slashed area A shown in the figure) equal to a multiplication of the writing power of the write strategy and the time interval, i.e., an energy area of the laser beam 13 required to form the mark.

Figure 3:
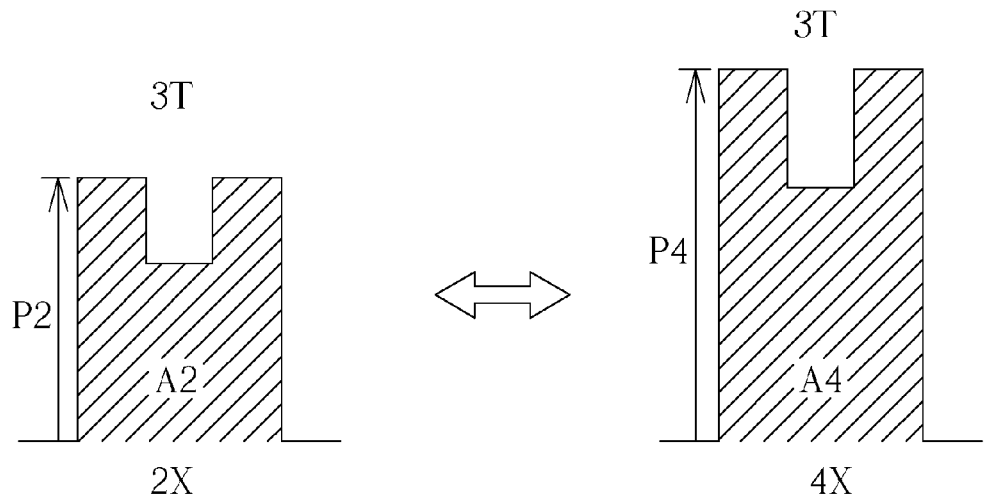
FIG. 3 is a diagram of an energy area variation of the present invention at different data transfer rates.

In the present invention, the energy areas for different data transfer rates and identical write strategies have an identical time interval, and the write strategy is set according to a level of a writing power at each data transfer rate, as an energy area ratio of the mark burning strategy of each data transfer rate is supposed to be identical to a ratio of the writing power of each data transfer rate. This is shown in FIG. 3, which illustrates an energy area variation of the present invention at different data transfer rates. The present invention utilizes a mark of 3T at data transfer rate 2× and 4× as an example. Under the configuration of the write strategy of the 3T mark, an identical 3T time interval and a variation of writing power make the energy areas of data transfer rates 2× and 4× maintain a substantially identical shape, the only difference being the respective power levels P2 and P4 of the data transfer rates 2× and 4×. Therefore, a ratio of the energy area at the data transfer rates 2× and 4×, i.e., A2:A4, is equal to the writing power level ratio of the data transfer rates 2× and 4×, i.e., P2:P4, and thus P2/P4=A2/A4.

Figure 4:
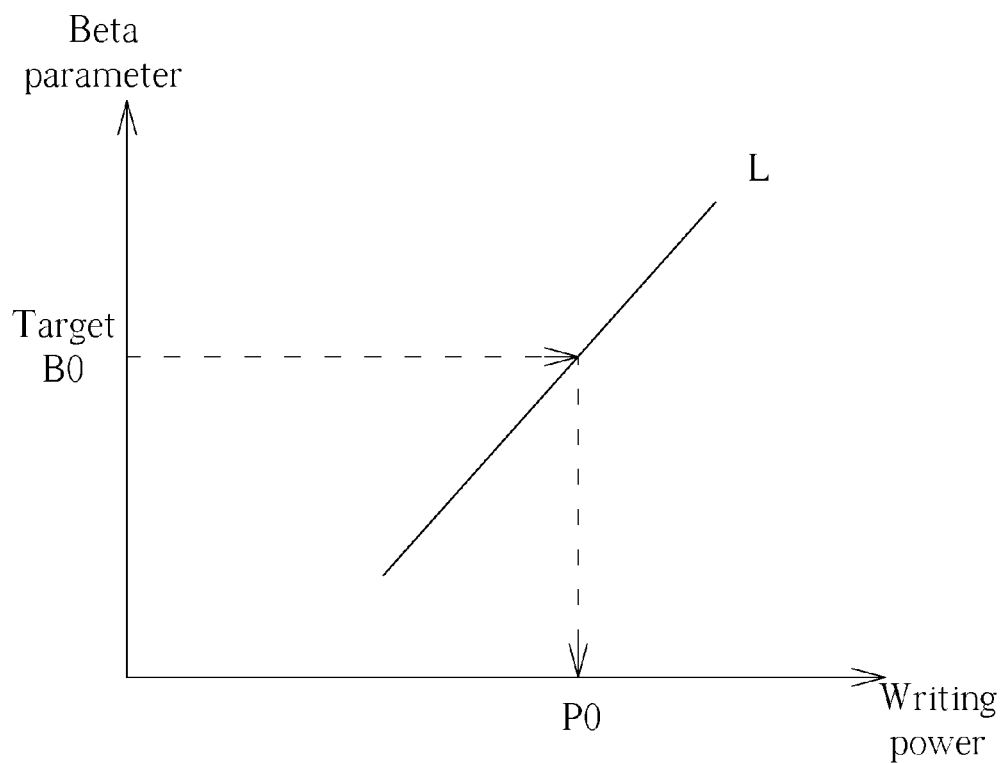
FIG. 4 is a first embodiment of the OPC test of an optical disc drive writing method of the present invention.

FIG. 4 is a first embodiment of the OPC test of an optical disc drive writing method of the present invention. The present invention utilizes the OPC test of the prior art to perform a testing for a predetermined data transfer rate. To obtain a relation L of the writing power at the predetermined data transfer rate to the beta parameter, a writing power P0 at the predetermined data transfer rate is derived from a target beta parameter B0 at the predetermined data transfer rate stored in the optical disc. Then, the energy area ratios of each data transfer rate and the predetermined data transfer rate are utilized to calculate the writing power Pn of each data transfer rate.

For example, setting the lowest data transfer rate 2× as the predetermined data transfer rate, the writing power P2 is derived via the OPC test, and the energy areas A2 and A4 of the data transfer rates 2× and 4×, respectively, are calculated utilizing the energy area ratio A4/A2 to derive that the writing power of the data transfer rate 4× is P4=P2×A4/A2. Similarly, the ratio of the energy area of each data transfer rate to the energy area of the data transfer rate 2× is utilized, and then writing powers of the other data transfer rates are calculated to perform data writing.

Figure 5:
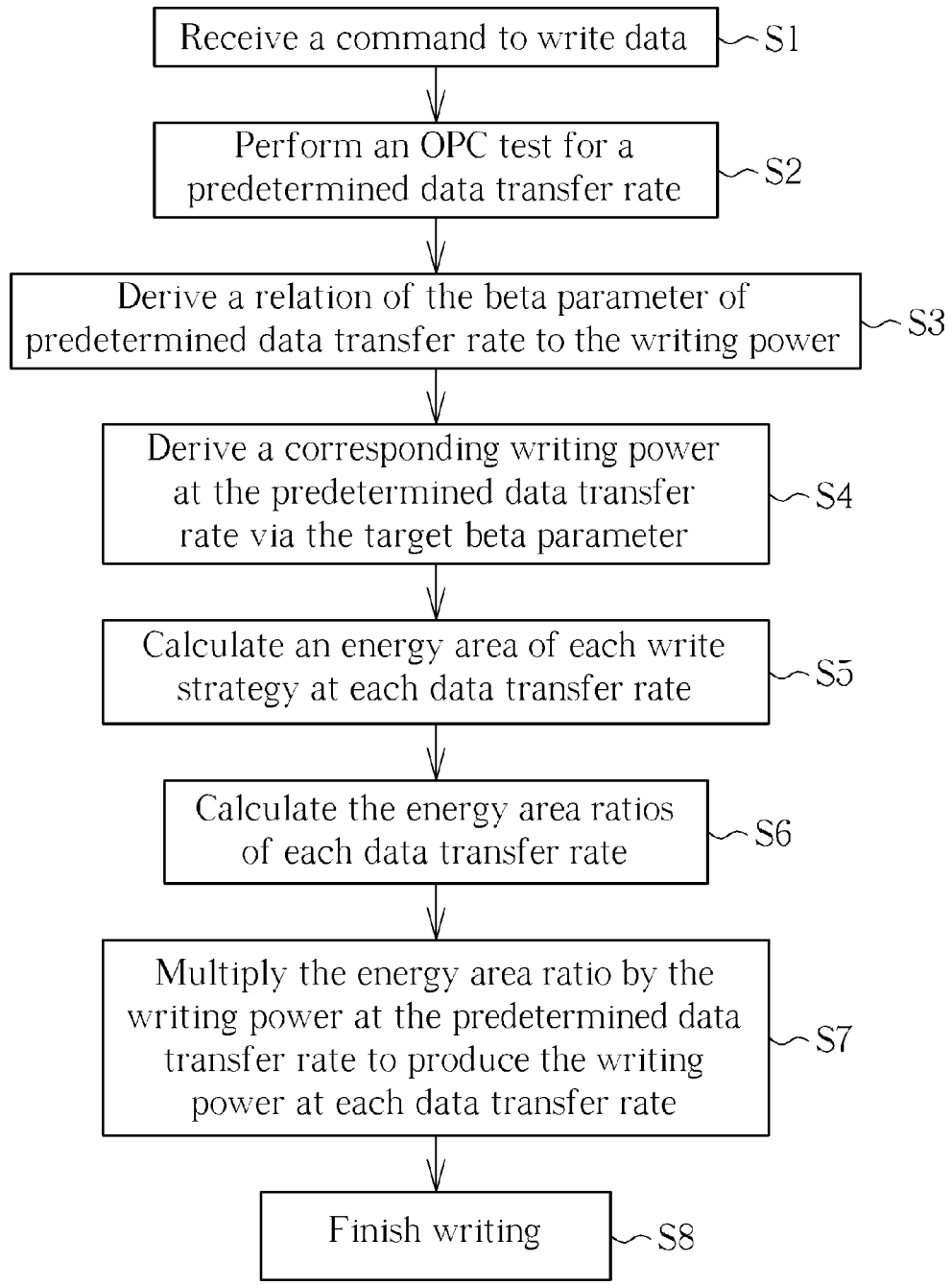
FIG. 5 is a flowchart of the first embodiment of the optical disc drive writing method of the present invention.

FIG. 5 is a flowchart of the first embodiment of the optical disc drive writing method of the present invention. For the present invention, the steps of using the energy area ratio of each data transfer rate to derive the writing power of each data transfer rate are detailed as follows: firstly in step S1, a command to write data in an optical disc capable of being written with multiple data transfer rates is received; in step S2, an OPC test for a predetermined data transfer rate is performed, e.g., the lowest data transfer rate 2×; in step S3, a relation of the beta parameter of predetermined data transfer rate to the writing power is derived; in step S4, a relation of the target beta parameter at the predetermined data transfer and the relation of the beta parameter of predetermined data transfer rate to the writing power derived in step S3 is utilized to derive a corresponding writing power at the predetermined data transfer rate; in step S5, an energy area of each write strategy at each data transfer rate stored in the optical disc is calculated; in step S6, the energy area ratios of each data transfer rate is calculated; in step S7, the energy area ratio by the writing power at the predetermined data transfer rate is multiplied to produce the writing power at each data transfer rate. Finally, in step S8, data writing is completed with the writing power of each data transfer rate.

In the aforementioned step S5 in the first embodiment of the present invention, the calculated energy areas of all write strategies at each data transfer rate and the predetermined data transfer rate, e.g., the energy area of marks 3T to 11T, are utilized as references to derive energy area ratios. For those marks of typical data writing, however, more than 80% are marks of 3T to 5T. Therefore, if only marks in common usage (3T to 5T) are utilized as references of energy area ratios, an approximate writing power Pn of each data transfer rate can be derived.

As a result, in the first embodiment of the optical disc drive writing method of the present invention, by comparing the energy areas of mark burning strategies of all marks or partial marks in common usage at each data transfer rate to the detected energy area at the predetermined data transfer rate, a correct writing power at each data transfer rate can be obtained easily by utilizing the writing power of the actual OPC test at a predetermined data transfer rate, and therefore the goal of maintaining a stable writing quality is achieved.

Figure 6:
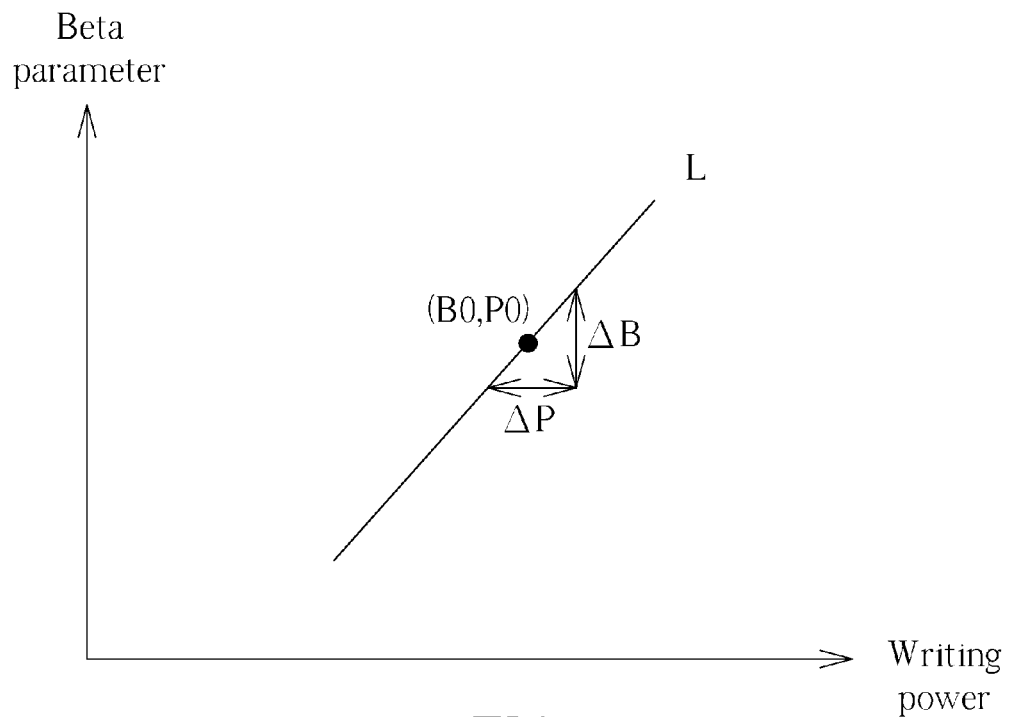
FIG. 6 is a second embodiment of the OPC test of an optical disc drive writing method of the present invention.

In the aforementioned first embodiment of the present invention, due to some errors or only the energy areas of partial marks in common usage being calculated to obtain the energy area ratio, there are still some differences between the derived writing power Pn of each data transfer rate and the actual writing power at each data transfer rate. Another embodiment of the optical disc drive writing method of the present invention further utilizes the OPC test result to perform compensation to derive the writing power Pn at each data transfer rate. Please refer to FIG. 6, which is a second embodiment of the OPC test of an optical disc drive writing method of the present invention. The writing method of the second embodiment performs an OPC test at a predetermined data transfer rate. Via using a relation L between the writing power at the predetermined data transfer rate and the beta parameter, not only can a writing power P0 derived from the target parameter B0 be derived, but also a variation relationship of the writing power at the predetermined data transfer rate to the beta parameter can be obtained. For example, an OPC test result or a slope around the target value (P0, B0) can be utilized to calculate a variation of the writing power at the predetermined data transfer rate to the beta parameter, $\Delta B/\Delta P$.

Figure 7:
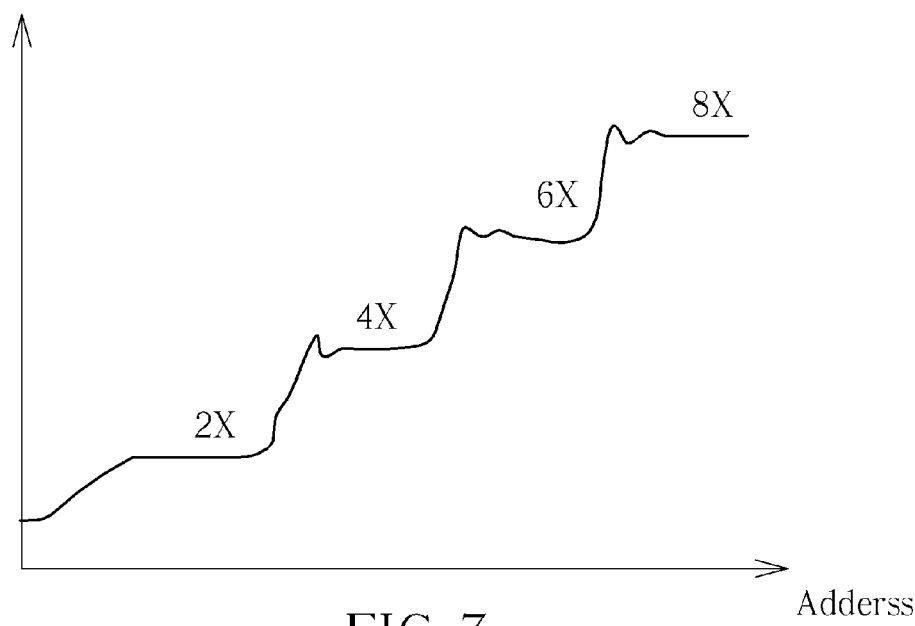
FIG. 7 is a diagram of compensating the writing power according to the second embodiment of the present invention.

As described in the first embodiment of the present invention, a ratio of the energy area of mark burning strategies at each data transfer rate to the energy area at the predetermined data transfer rate Kn is equal to the ratio of the writing power at each data transfer rate to the writing power at the predetermined data transfer rate, and for an identical beta parameter variation $\Delta B$, the compensating value of the writing power Pn is also varied according to a ratio $Kn \times \Delta P$. FIG. 7 illustrates a diagram of compensating the writing power according to the second embodiment of the present invention. The second embodiment of the present invention performs data writing with the writing power Pn of each data transfer rate derived in the first embodiment. Via an auto writing control (AWC) when writing and reading written marks simultaneously, detecting a difference between the beta parameter and target beta parameter $\Delta B$, referring to the variation of the writing power at the predetermined data transfer rate to the beta parameter, i.e., $\Delta B/\Delta P$, in the OPC test result at the predetermined data transfer rate, increasing a writing power difference according to a multiple of the energy area ratio Kn to compensate the writing power (that is, the compensated writing power $P=Pn+Kn \times \Delta P$), and then converging to the target beta parameter, a stable writing quality is therefore maintained.

Figure 8:
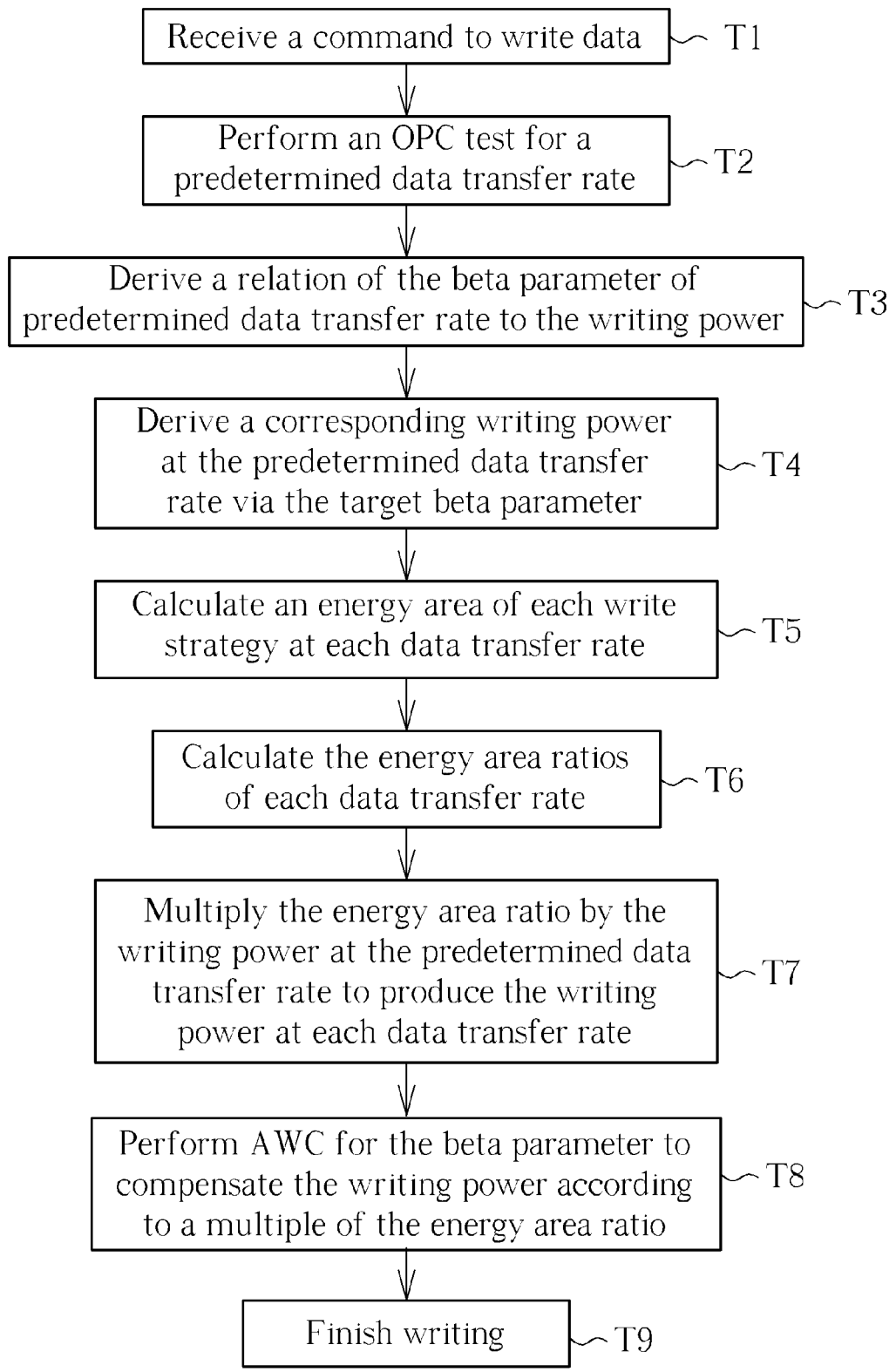
FIG. 8 is a flowchart of the optical disc drive writing method according to the second embodiment of the present invention.

This is shown in FIG. 8, which is a flowchart of the optical disc drive writing method according to the second embodiment of the present invention. The steps of compensating the writing power of each data transfer rate by using the energy area ratio of each data transfer rate are detailed as follows: in step T1, a command to write data in an optical disc capable of being written with multiple data transfer rates is received; in step T2, an OPC test for a predetermined data transfer rate is performed; in step T3, a relation of the beta parameter of predetermined data transfer rate to the writing power is derived; in step T4, a relation of the target beta parameter at the predetermined data transfer rate and the relation of the beta parameter of predetermined data transfer rate to the writing power is utilized to derive a corresponding writing power at the predetermined data transfer rate; in step T5, an energy area of each write strategy at each data transfer rate stored in the optical disc is calculated; in step T6, the energy area ratios of each data transfer rate to the predetermined data transfer rate are calculated; in step T7, the energy area ratio is multiplied by the writing power at the predetermined data transfer rate to produce the writing power at each data transfer rate; in step T8, data writing and detecting a difference between the beta parameter and the target beta parameter at each data transfer rate areas via AWC is performed, and a variation of the writing power and the beta parameter of the OPC test result is referred to for increasing the writing power difference to compensate the writing power according to a multiple of the energy area ratio. Finally in step T9, writing data is finished.

Therefore, the optical disc drive writing method of the second embodiment of the present invention utilizes the write strategy of each data transfer rate stored in the optical disc to calculate the energy area ratio. Via detecting a variation of the beta parameter to the writing power at the predetermined data transfer rate to derive a variation of the beta parameter to the writing power at the high data transfer rates for compensating the writing power, and converging the beta parameter to the target beta parameter, the goal of enhancing writing efficiency is achieved.

Those skilled in the art will readily observe that numerous modifications and alterations of the device and method may be made while retaining the teachings of the invention.

What is claimed is:
1. A writing method for an optical disk drive, comprising:
   (1) receiving a command to write a disc;
   (2) implementing an optimum power control (OPC) test for a predetermined data transfer rate to obtain a relation of beta parameter to writing power;
   (3) acquiring a writing power at the predetermined data transfer rate with a target beta parameter according to the relation of the beta parameter to the writing power;
   (4) calculating ratios of energy areas of write strategies for every data transfer rate with the predetermined data transfer rate, wherein each of the energy area is a multiplication product of a modulation writing power of write strategies of each mark and an interval time;
   (5) multiplying the ratio of the energy area by the writing power at the predetermined data transfer rate to produce the writing power at each data transfer rate; and
   (6) finishing writing data.
2. The writing method of claim 1, wherein the predetermined data transfer rate is a minimum data transfer rate of the disc.
3. The writing method of claim 2, wherein the predetermined data transfer rate is a data transfer rate 2×of the disc.
4. The writing method of claim 1, wherein the write strategies for calculating every data transfer rate in step (4) are write strategies for marks in common usage.
5. The writing method of claim 4, wherein the marks in common usage are marks of 3T to 5T.
6. The writing method of claim 1, wherein the step (3) further acquires a variation rate of the beta parameter to the writing power according to the relation of the beta parameter of the predetermined data transfer rate to the writing power.
7. The writing method of claim 6, wherein the variation rate of the beta parameter to the writing power is a variation rate around the beta parameter of the predetermined data transfer rate and the writing power.
8. The writing method of claim 6, wherein the step (5) further comprises:
   (5-1) performing writing and compensating the writing power with automatic writing control in each area according to a difference between the target beta parameter and the tested beta parameter.
9. The writing method of claim 7, wherein referring to the variation rate of the beta parameter of the predetermined data transfer rate to the writing power comprises: compensating the writing power by increasing a difference of writing powers according to the energy area ratio.

* * * * *